March 5, 1929.  H. T. COLLARD  1,704,557
CLOSED AUTO BODY VENTILATOR
Filed Sept. 10, 1927  3 Sheets-Sheet 1

INVENTOR.
H Thomas Collard
BY
Myron J Dikeman
ATTORNEY.

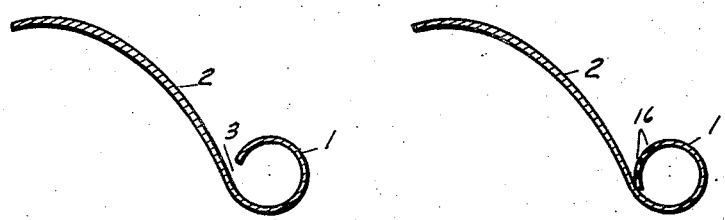
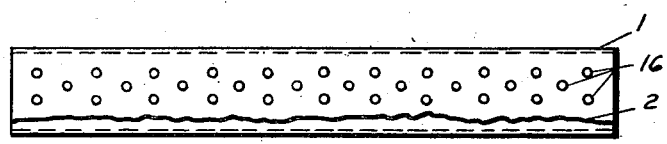
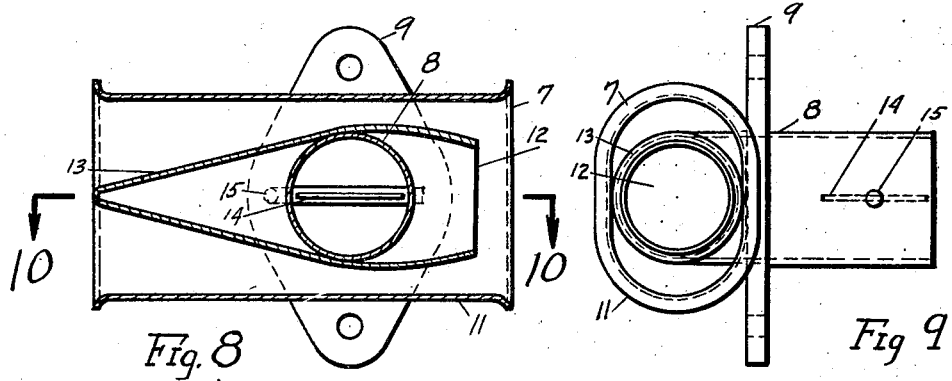
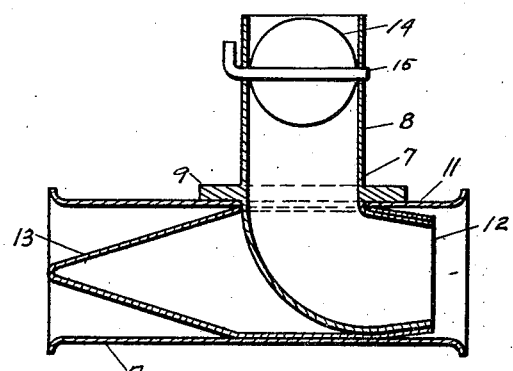

March 5, 1929. H. T. COLLARD 1,704,557
CLOSED AUTO BODY VENTILATOR
Filed Sept. 10, 1927 3 Sheets-Sheet 3

INVENTOR,
H. Thomas Collard
BY Myron J. Dikeman
ATTORNEY.

Patented Mar. 5, 1929.

1,704,557

UNITED STATES PATENT OFFICE.

HENRY THOMAS COLLARD, OF DETROIT, MICHIGAN.

CLOSED AUTO BODY VENTILATOR.

Application filed September 10, 1927. Serial No. 218,684.

The object of my invention is to provide a ventilating device adapted for installation within the rear wall of an automobile for securing effective ventilation therein and deadens the sound within a closed auto body.

Another object is to provide a rear ventilating device designed and positioned within the auto body to intercept and prevent circulating air currents from coming in contact with the occupants of the auto, and to stop the circulating drafts within the body.

A further object is to devise a ventilating system whereby the upper air currents may be intercepted and ejected from the auto body, and especially any smoke that may be caused by occupant smoking therein, and which naturally rises to the roof of the auto body, the same being carried to the rear of the car by air currents when the auto is in motion.

A still further object is to provide a rear ventilator for closed automobile bodies that is simple in construction, easily and efficiently operated and can be manufactured at a very low cost. These several objects are attained in the preferred form by the construction and arrangement of parts more fully hereinafter set forth.

Similar parts on all drawings are marked by similar numerals.

Fig. 5, is a sectional view taken on line 5—5— of Fig. 1 showing the formation of the combined ventilating tube and deflector.

Fig. 6 is also a sectional view taken on the line 5—5 of Fig. 1, showing an alternate section for construction where perforations are used instead of an extended opening.

Fig. 7, is a sectional view taken on the line 4—4 of the Fig. 2 also showing the alternate perforated construction that may be used instead of the full opening as illustrated in Fig. 4.

Fig. 8 is an enlarged sectional detail view of the suction ventilator taken on the line —8—8— of Fig. 2, showing the interior construction of the end section.

Fig. 9 is an end view of the suction ventilator shown in the preceding figure, showing the relative position of the tubes.

Fig. 10 is a sectional view taken on the line 10—10 of the Fig. 8, showing the internal air channels, and control valve.

Figure 12:
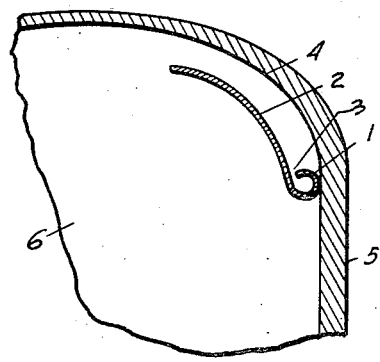
Figure 13:
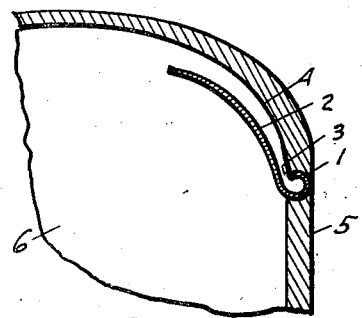
Figure 15:
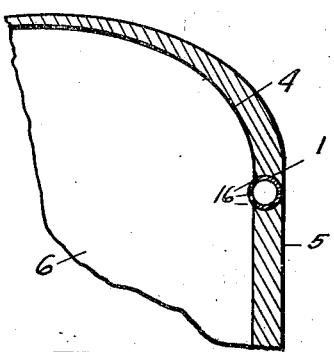

Figs. 12, 13, and 15, illustrate the different types of installation to which my device is adapted.

Figure 14:
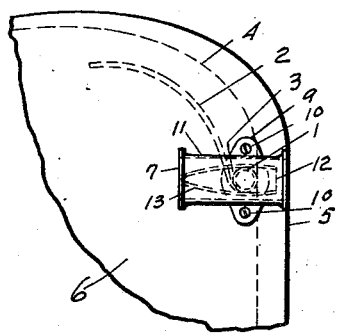

Fig. 14 is an outside view of an auto body showing the installation of the device and the position of the exterior suction ventilators.

I will now described more fully my device, referring to the drawings and the marks thereon.

In general my device comprises an open tubular section for installation across the rear inside wall of a closed automobile body, and provided with an air deflecting plane. The tubular section is extended through the side walls of the auto body and turned toward the rear of the body, carrying thereon special air suction ventilators for causing a suction within the ventilator tube.

For simplicity in construction, and for simplicity in illustration of my device, the ventilator tube —1— and the deflector shield —2— are formed of a continuous piece of sheet metal, of a length to extend the width of the auto body in which it is to be installed. The tube —1— is formed in approximately a cylindrical formation but providing an opening —3— between the sheet edge and the deflector shield —2—, also extending the entire length of the tube —1—. The deflector shield —2— is formed by continuing the metal sheet in approximately an S-shaped curve of a design corresponding to the usual curved corner —4— ordinarily formed in the present day car construction, as illustrated in Fig. 12. The tube —1— is placed along the rear wall —5— of the auto body and may be attached thereto by any convenient means for holding same in a fixed position therein. Through openings in the side walls —6— of the auto body are mounted the suction ventilators —7—, positioned therein to fit and engage the ends of the ventilator tube —1— at both ends, and open therein. The suction ventilators —7— comprise a hollow tubular elbow section —8— designed to pass through the auto body wall —6 and engage the ventilator tube —1— within the auto body, for continuing the passage outside the body walls. The curved elbows are positioned to lead toward the rear of car body. A flange collar —9— is formed in the tubular elbow —8— for fitting the outer body walls and are fixedly attached thereto by the screws —10— passing through the flange holes. Fixedly attached to the flanged collar —9— is a flattened tubular casing —11—, placed at right angles to the axis of the ventilator tube —1— and attached to the auto body in a horizontal position, inclosing therein the tubular elbow outlet —12— at the rear end thereof. Within the flattened tubular casing —11— is mounted a conical suction tube —13—, fixedly attached to the casing along the axis therein, and also incloses the elbow outlet —12—, and all being open at the back end. The conical suction tube —13— is so positioned within the casing —11 as to provide openings both above and below the cone tube, allowing air to pass over and around the outlet opening —12—, causing a vacuum and suction on the outlet opening when the automobile is in motion. The casing —11— may be made of a flattened tubular section as illustrated in the drawings, or it may be made a conical formation having the larger conical end in front and the smaller conical end of the casing positioned toward the rear of the auto body and surrounding the outlet opening —12— in the same manner as illustrated. The operation is the same except the conical shaped casing will intercept a greater amount of air when the car is traveling on the road, and produce a slight increase in air velocity over the tubular elbow outlet —12—, and slightly increase the air suction thereon. Within the inner end of the tubular elbow —8— is mounted a regulating valve —14—, pivotally mounted therein by the shaft —15— and may be turned to any position for closing or regulating the passage and amount of ventilation within the auto body. Any type of regulating valve which will control the size of the tube passage will operate as well and may be substituted therefor.

When my device is installed within an automobile body, as illustrated in Figs. 11 to 15 inclusive, the roof air currents are intercepted by the deflector shield —2— and injected through the tube opening —3—, directly into the ventilator tube —1—. When the car is in motion air is forced through the suction casings —7— attached to the outside body walls, causing a vacuum or suction on the outlets —12— and creates a draft through the ventilator and will materially lessen and deaden the noise or roar commonly experienced in a closed auto body.

Figure 2:
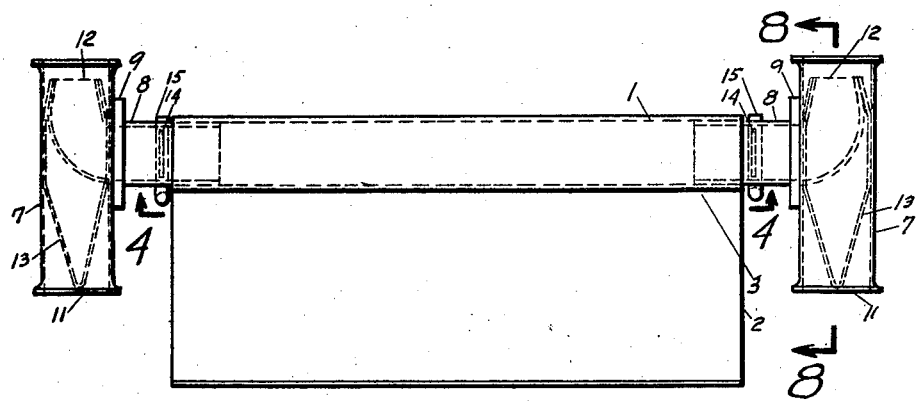
Fig. 2 is a top view of the device showing the general arrangement of the operating parts.
Figure 1:
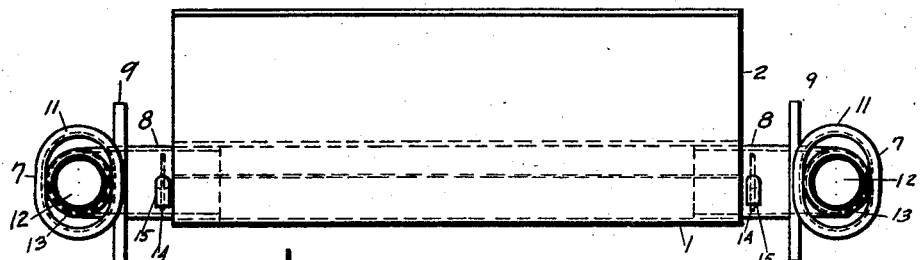
Fig. 1 shows a front view of my device as assembled and ready for installation within an automobile body.
Figure 4:
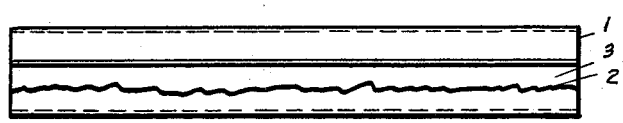
Fig. 4 is a sectional view taken on the line —4—4— of the Fig. 2, showing the inlet opening leading within the ventilating tube.
Figure 3:
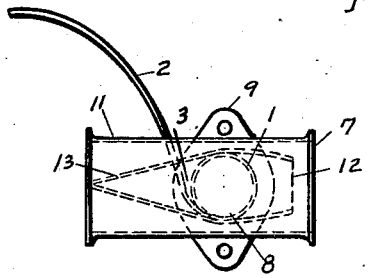
Fig. 3 is an end view of the device, showing the relative position of the parts and the passage channels.
Figure 11:
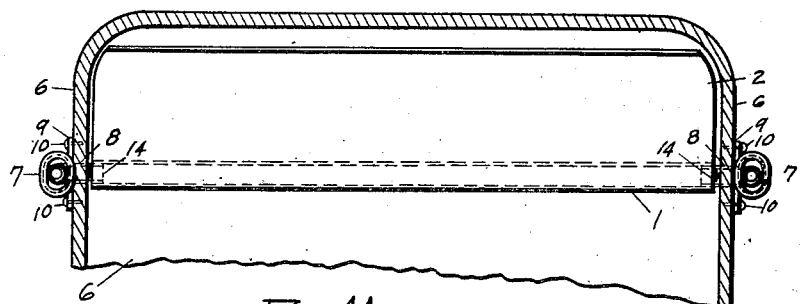
Fig. 11 is a sectional view of an automobile body showing my device installed therein, illustrating the means for intercepting and ejecting the air currents from the auto body.

It is apparent that my device is subject to various modifications without departing from the spirit of my invention, as is illustrated by the alternate forms of construction. Figs. 6 and 7 illustrate an alternate form of ventilating tube utilizing perforations —16— therein instead of the open section illustrated in Fig. 4, and substantially with the same results. Also various designs of suction casings may be substituted for the ones illustrated on the drawings for causing an air suction on the outlets —12—, and in cases where more inexpensive designs are required the casings —7— may be omitted altogether, resulting in substantially a perforated ventilator pipe installed within the auto body and having the ends projected through the side body walls and turned back toward the rear of the auto body. Also, if desired the deflector shield —2— may be omitted as illustrated in Fig. 15 although the resulting device will be less effective in intercepting the circulating roof air currents. Figs. 12 and 14 show the device as mounted with an automobile body as an accessory, while Figs. 13 and 15 show the same device built in as a part of the body structure. The operation is the same in all cases.

Having fully described my ventilating device what I claim as my invention and desire to secure by Letters Patent is:

1. A ventilating device adapted for installation within a closed auto body, comprising a ventilator tube for fixedly attaching to the rear body wall near the ceiling thereof, said ventilator tube being open along the front side thereof and having the ends of the said tube projected through the side walls of the auto body and curved toward the rear of the auto body, an air deflector shield mounted along the front side of said ventilator tube and inclosing the tube side opening positioned thereon to deflect the air currents into the tube opening.

2. A ventilating device adapted for installation within a closed auto body, comprising a ventilating tube for fixedly attaching across the rear wall of the auto body, said ventilator tube having both ends open and projected through the side walls of the auto body and curved toward the rear of the body, air suction ventilators mounted on each of the tube ends outside of the body walls, said ventilator tube having an air opening formed along the front side of the tube and an air deflector shield mounted on said ventilator tube in front of said air opening for deflecting air currents therein.

3. A ventilating device adapted for installation within a closed auto body, comprising an open ventilator tube for fixedly attaching to the rear wall of an auto body, a deflector shield attached to said tube in front of the tube opening for deflecting air currents therein, said ventilator tube having both ends open and projected through the side walls of the auto body, the said tube ends being curved back toward the rear of the body, and regulating valves mounted within each end of said ventilating tube for regulating or closing the tube opening as desired.

4. A ventilating device adapted for installation within a closed auto body, comprising a hollow ventilating tube having a side wall opening formed nearly the entire length thereof for fixedly mounting within the rear wall of the auto body, an air deflector shield mounted along the front side of said ventilator tube in front of said tube opening for intercepting and deflecting air currents into the tube opening, said hollow ventilating tube having both ends open and projected through the side walls of the auto body with the said ends turned back toward the rear of the auto body, a suction casing mounted on each of the curved tube ends outside the auto body side walls, means mounted within said casings for causing a suction on the ends of the ventilator tube openings, and regulating valves mounted within each tube end.

5. A ventilating device adapted for installation within a closed auto body, comprising a hollow ventilator tube having side wall openings formed therein nearly the entire length of said tube, for fixedly mounting on the rear wall of the auto body near the ceiling, an air deflector shield positioned along said ventilator tube in front of said air tube openings for intercepting and deflecting air currents within the ventilating tube, said ventilator tube having both ends thereof open and projected through the side walls of the auto body, said tube ends being curved back toward the rear of the auto body, regulating valves mounted within said tube passages for regulating or closing said tube passage, a hollow casing mounted over the ends of said ventilator tube outside the body walls, a conical suction tube mounted within said casings and inclosing the ventilator tube end openings, said cone suction tube being positioned with the pointed end thereof toward the front and the large open ends inclosing the ventilator tube openings, and forming air passages between said cone tube and the inclosing casing for causing air suction over the ventilator tube ends when the auto is in motion.

In witness whereof I sign these specifications.

H. THOMAS COLLARD.